United States Patent [19]

Clough

[11] Patent Number: 5,400,826

[45] Date of Patent: Mar. 28, 1995

[54] TEMPORARILY BLOCKING THE BORE OF A PIPE THROUGH WHICH A FLUID FLOWS WITH A FOAMED PLUS REMOVED BY DISSOLVING

[75] Inventor: Peter S. Clough, Stretford, England

[73] Assignee: British Gas PLC, London, United Kingdom

[21] Appl. No.: 52,288

[22] Filed: Apr. 26, 1993

Related U.S. Application Data

[60] Division of Ser. No. 729,905, Jul. 15, 1991, abandoned, which is a continuation of Ser. No. 635,380, Jan. 3, 1991, abandoned, which is a continuation of Ser. No. 435,051, Nov. 9, 1989, abandoned.

[30] Foreign Application Priority Data

Jan. 5, 1989 [GB] United Kingdom ............... 8900205
Nov. 10, 1989 [GB] United Kingdom ............... 8826349

[51] Int. Cl.[6] ........................................... F16L 55/00
[52] U.S. Cl. ............................................... 138/89; 138/93; 138/97
[58] Field of Search .................. 138/89, 90, 93, 97, 138/98; 206/219, 568

[56] References Cited

U.S. PATENT DOCUMENTS

| | | | |
|---|---|---|---|
| 3,338,499 | 8/1967 | Gilbert | 138/89 |
| 3,498,838 | 3/1970 | Scott | 138/89 |
| 3,565,103 | 2/1971 | Brachschob et al. | 138/93 |
| 3,956,439 | 5/1976 | Hansel | 138/89 |
| 4,012,822 | 3/1977 | Vrolyk | 138/89 |
| 4,174,735 | 11/1979 | Visbach | 138/97 |
| 4,357,960 | 11/1982 | Han | 138/97 |
| 4,436,120 | 3/1984 | Josien et al. | 138/93 |
| 4,540,089 | 9/1985 | Maloney | 206/219 |
| 4,607,469 | 8/1986 | Harrison | 128/89 |
| 4,751,947 | 6/1988 | Landers | 138/89 |
| 4,804,018 | 2/1989 | Carr et al. | 138/93 |

FOREIGN PATENT DOCUMENTS

| | | | |
|---|---|---|---|
| 0246835 | 11/1987 | European Pat. Off. | 206/568 |
| 1527267 | 10/1978 | United Kingdom . | |
| 2157390 | 10/1985 | United Kingdom . | |
| 672394 | 7/1979 | U.S.S.R. | 138/93 |

Primary Examiner—James E. Bryant, III
Attorney, Agent, or Firm—Oblon, Spivak, McClelland, Maier & Neustadt

[57] ABSTRACT

A method and kit is provided for temporarily blocking the bore of a pipe through which a fluid flows, the kit including an expansible flexible bag seal which is inserted through a hole provided in the wall of the pipe injecting into the bag seal. A quantity of a material adapted to expand in situ in the bag seal and inflate the bag seal to seal against the inside of the pipe is injected into the bag seal. The pipe may be a gas main and the material may be an expandable synthetic resin foam. The bag seal is removed by injecting thereinto a substance capable of dissolving the foam so that the bag seal can be at least partially deflated.

1 Claim, 1 Drawing Sheet

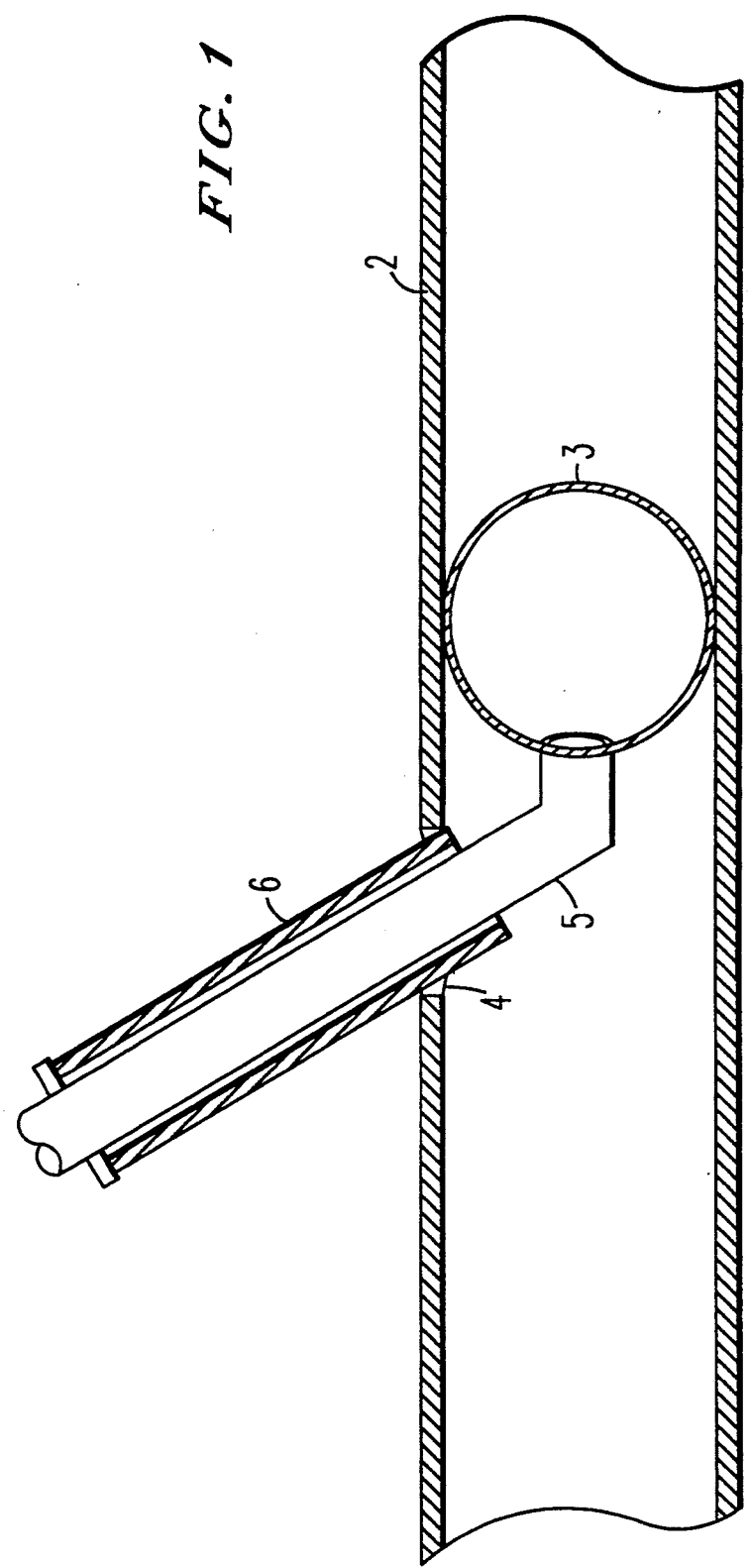

TEMPORARILY BLOCKING THE BORE OF A PIPE THROUGH WHICH A FLUID FLOWS WITH A FOAMED PLUS REMOVED BY DISSOLVING

This application is a division of application Ser. No. 07/729,905, filed on Jul. 15, 1991, now abandoned, which is a continuation of Ser. No. 07/635,380, filed Jan. 3, 1991, now abandoned, which is a continuation of 07/435,051, filed Nov. 9, 1989, now abandoned.

BACKGROUND OF THE INVENTION

The present invention relates to the temporary blocking of the bore in a pipe through which a fluid flows and is particularly directed to the temporary blocking of mains carrying natural gas.

Where repairs to a section of a gas main are to be carried out or where a section of the main is to be partially or completely replaced it is frequently necessary temporarily to block the bore or main at a point or points upstream of the section. This prevents the flow of gas to the section of the main downstream of the blockage so that the necessary work can be carried out.

At present such temporary blockage is performed with the aid of an expansible bag of the type having an innermost inflatable bladder usually of rubber contained with an outermost protective bag of nylon or some such similar material. In use of such bags, a hole is drilled in the wall of the main and the bag is inserted into the main by way of an insertion device in the form of a sealable tube which is temporarily securable in the hole so drilled. Once inside the main the inner bladder is inflated by a supply of pressurised gas e.g. compressed air, by way of a pipe connected to the mouth of the bag, the pipe also providing means for locating the bag inside the main through the insertion tube which forms a gas-tight seal around the pipe.

Inflation of the bladder causes it to expand and force the outer bag to engage with the inner wall of the main to form a seal against the wall of the main.

The bag is removed by deflating the bladder and then withdrawing the pipe from the main via the hole and the insertion tube.

Unfortunately the outer protective bag and even the inner bladder are frequently ripped or torn as they are withdrawn from the main. This renders the bag totally unservicable and it is not an uncommon occurrence that such bags are irreparably damaged after just one operation. Since these bags are relatively expensive, the overall cost of the repairs or replacement operations is increased owing to the wastage of such bags.

SUMMARY OF THE INVENTION

It is an object of the present invention to provide means whereby this overall cost may be reduced.

According to the present invention a method is provided for temporarily blocking the bore of a pipe through which a fluid flows, the method comprising inserting an expansible flexible bag seal through a hole provided in the wall of the pipe and injecting into the bag seal a quantity of a material which is adapted to expand in situ in the bag seal and inflate the bag seal to seal against the inside of the pipe.

The material may be in the form of a preformed expandable synthetic resin foam. Such foam has a molecular weight of $3 \times 10^5$. The monomer has a molecular weight of 125. The foam contains trace concentrations of Lewis and Bronsted acids of 0-500 ppm of water.

Alternatively the material may comprise components for mixing within the bag seal to form the expandable foam.

Preferably a quantity of a substance capable of dissolving the material within the bag seal is injected into the bag seal after inflation to dissolve the material within the bag seal so that the bag seal can be at least partially deflated by dissolution of the material to enable the bag seal to be removed from the pipe by way of the hole. A suitable solvent for this purpose is acetone.

The bag seal can comprise a single bag rather than a double-bag. The bag may be of a relatively cheap material such as polythene.

Since the bag seal itself, the foam and solvent can be of relatively cheap materials the components are disposable and the system provides a cheap disposable means for temporarily blocking the bore of a gas main.

BRIEF DESCRIPTION OF THE DRAWINGS

The FIGURE shows an expanded bag according to the invention within a pipe.

DETAILED DESCRIPTION OF THE PREFERRED EMBODIMENT

The bag 3 of for example polythene can, as is conventional, be inserted into the main 2 by way of a sealable insertion tube 6 whose end is temporarily located in a hole 4 drilled in the wall of the main. The mouth of the bag is first secured to the end of a supply conduit or 5, pipe before insertion and the bag is inserted in the main by pushing the pipe through the tube into the main, the tube 6 forming a gas-tight seal around the pipe. A suitable quantity of preformed expandable foam is produced by mixing together CDN 15A and CDN 15B is then injected into the bag by way of the pipe 5. The foam is allowed to expand and inflate the bag to form a seal against the inner wall of the main.

To remove the bag a suitable quantity of a substance capable of dissolving the foam is injected into the bag 3 by way of the pipe 5. A suitable substance is acetone and this is allowed to dissolve the foam so that the bag is at least partially deflated. The pipe 5 is then withdrawn through the tube 6 to remove the bag from the main. Since the bag, the foam and solvent are disposable it does not matter whether the bag is damaged since it will not be reused.

I claim:

1. A method for temporarily blocking the bore of a pipe through which a fluid flows, the method comprising the steps of:
   producing a hole in the wall of a pipe;
   temporarily locating an end of an insertion tube in the hole so as to form a gas tight seal at the hole;
   securing an end of a supply conduit to a mouth of a flexible bag;
   inserting the flexible bag having the supply conduit secured thereto into the bore of the pipe through the insertion tube which has been located at the hole;
   injecting a quantity of expandable foam into the flexible bag via the supply conduit;
   inflating the flexible bag with the expandable foam to form a seal of the flexible bag directly blocking the bore of the pipe and, after inflating the flexible bag;
   injecting through the insertion tube and into the flexible bag a quantity of a substance capable of dissolving the foam to such an extent that the flexible bag is at least partially deflated and removing the flexible bag from the pipe after the flexible bag has been at least partially deflated.

* * * * *

UNITED STATES PATENT AND TRADEMARK OFFICE
CERTIFICATE OF CORRECTION

PATENT NO. : 5,400,826
DATED : March 28, 1995
INVENTOR(S) : Peter S. Clough

It is certified that error appears in the above-indentified patent and that said Letters Patent is hereby corrected as shown below:

On the title page, Item [54] and Column 1, Lines 2-4, the title should read:

--TEMPORARILY BLOCKING THE BORE OF A PIPE THROUGH WHICH A FLUID FLOWS WITH A FOAMED PLUG REMOVED BY DISSOLVING--

Also on the title page, Item [30], the second Foreign Application Priority Date should read:

--Nov. 10, 1988--

Signed and Sealed this

Twenty-third Day of April, 1996

Attest:

BRUCE LEHMAN

Attesting Officer

Commissioner of Patents and Trademarks